L. F. ADT.
EYEGLASSES.
APPLICATION FILED AUG. 2, 1907.
926,728.
Patented July 6, 1909.
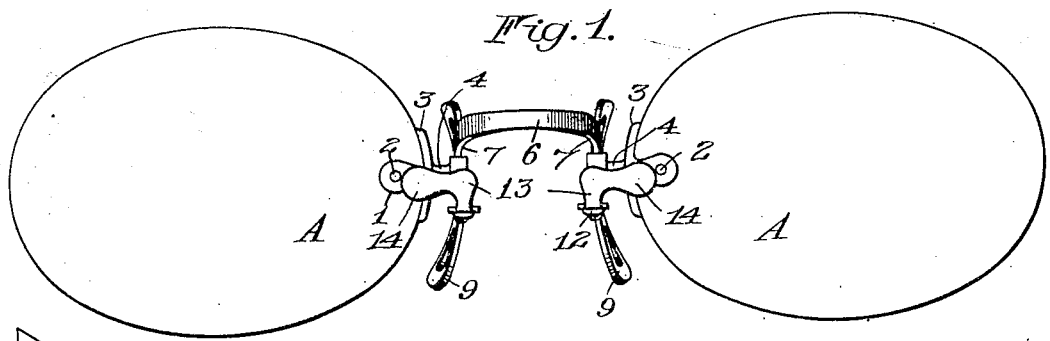
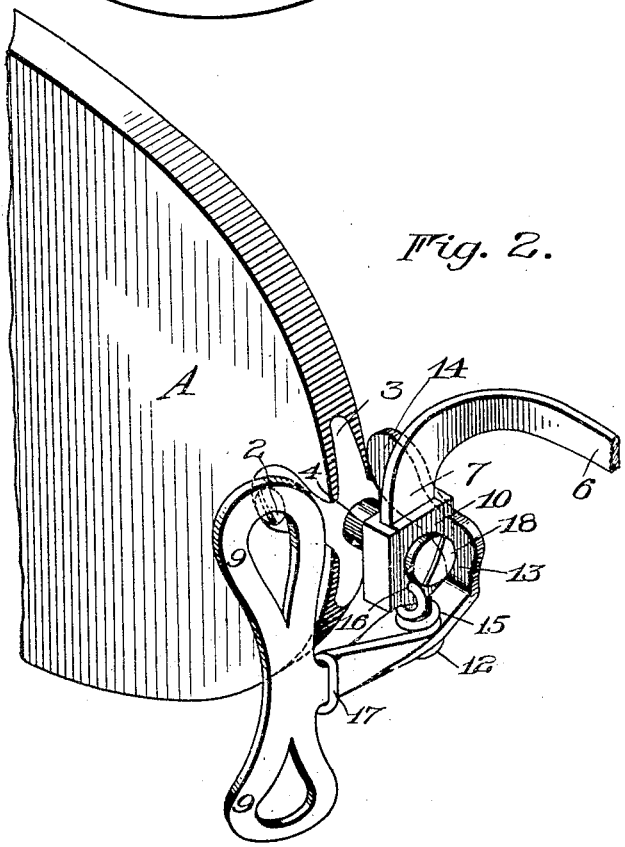
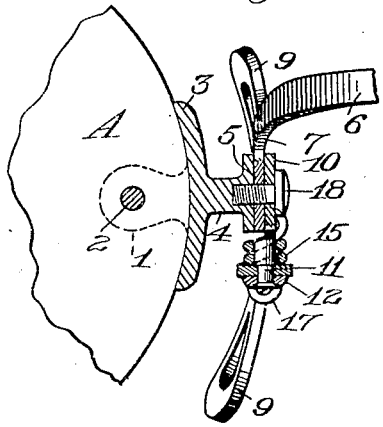

UNITED STATES PATENT OFFICE.

LEO F. ADT, OF ALBANY, NEW YORK.

EYEGLASSES.

No. 926,728.   Specification of Letters Patent.   Patented July 6, 1909.

Application filed August 2, 1907. Serial No. 386,692.

*To all whom it may concern:*

Be it known that I, LEO F. ADT, of Albany, in the county of Albany and State of New York, have invented certain new and useful Improvements in Eyeglasses; and I do hereby declare the following to be a full, clear, and exact description of the same, reference being had to the accompanying drawings, forming a part of the specification, and to the reference characters marked thereon.

The present invention relates to eyeglasses of the type in which the nose guards are positioned by finger pieces or forwardly extending arms, and has for an object to provide a construction in which the lens attaching devices, or lens mounts, are separate from the bridge.

To these and other ends the invention consists in certain improvements and combinations of parts all as will be hereinafter more fully described, the novel features being pointed out in the claims at the end of the specification.

In the drawings: Figure 1 is a front view of eyeglasses embodying my invention. Fig. 2 is a perspective view of one of the nose guards and the adjacent parts of the eyeglasses, and Fig. 3 is a vertical section through one of the lens mounts showing adjacent parts.

In eyeglasses employing finger-piece noseguards as ordinarily constructed, it is necessary to provide a specially formed mounting for a person whose nose is not in the center of his face, if the centers of the lenses are to aline with the centers of the pupils of the eyes. With eyeglasses constructed in accordance with this invention, the making of special mountings is rendered unnecessary for the reason that the nose guards are separate from the lens mounts and are secured to the mounting in such a manner that lens mounts of different lengths may be employed. A further feature of this invention is the provision of finger-piece nose guards with attaching brackets adapting them for commercial forms of eyeglasses.

In the present embodiment of the invention the mounting comprises a support consisting of the lens mounts or attaching devices and a bridge, and a pair of nose guards having their own attaching brackets.

The lens mounts or attaching devices may be of the common or commercial form, that is, a pair of perforated ears 1 secured by a screw 2 to the lenses A and connected by a lens bearing portion 3 from which extend the posts 4 having vertical seats 5 at their outer ends. The bridge 6 connects the lens mounts and may be of any style that is formed separately therefrom, in the present instance having vertically arranged attaching arms or ends 7 to fit in the seats 5.

The nose guards which are formed each with a forwardly extending operating arm and a rearwardly extending nose bearing portion 9, are mounted on the support so that the distance between them will not be affected by the employment of lens mounts of different lengths. In the present embodiment they are separate from the bridge and are swingingly mounted on their own attaching brackets, each of which preferably consists of an upwardly extending or vertical perforated arm 10 fitting within a vertical seat 5, and carrying a vertical pivot 11 at its lower end, the nose guards being preferably held thereon by a head 12. The forwardly extending arm of each guard may be bent vertically as in an upward direction, at 13 to the horizontal plane of the lens mount and then extended outwardly at 14 in front of the latter so that the finger piece and the lens mount make but one line and are thus inconspicuous. This operating arm is also adapted for use on other types of finger-piece nose guards.

In order to position each nose guard, there are provided springs, each of which in this instance is coiled around the pivot at 15 so as to have a common axis therewith and is secured at one of its ends to the bracket as by being passed through a perforation therein at 16, the other of its ends being secured to the rearwardly extending portion of the guard, as at 17.

A single fastener, as a screw 18, passes through the perforated attaching bracket 10 and through an end of the bridge and securely holds these parts in the vertical seat of a lens mount.

It is apparent that with this invention, if the centers of the lenses do not aline with the centers of the pupils, the replacing of the lens mounts by others of different length will shift the lenses relatively to the eyes so as to give the proper result. It is further to be noted that the construction of the guard permits of its being manufactured separately in order that they may be used with eyeglass mountings of other types.

I claim as my invention:

1. In an eyeglass mounting, the combination with a support comprising a pair of lens mounts having boxes at their inner ends, of a bridge having portions detachably secured in said boxes, brackets having portions secured in said boxes and each carrying a pivot lying in a plane with the proximate box transverse to the plane of the lenses held by the lens mounts, nose guards mounted to swing on said pivots and carrying upper and lower nose bearing portions, and springs separate from said nose bearing portions for positioning the guards.

2. In an eyeglass mounting, a bridge, lens mounts having vertical seats receiving the ends of the bridge, nose guards having forwardly extending operating arms, and mounted to swing about vertical axes, brackets on which the nose guards are swingingly mounted, fitted in the vertical seats, and separate springs for moving the nose guards toward the nose.

3. A new article of manufacture comprising a bracket having an eye adapting it for attachment to an eyeglass mounting and carrying a vertically arranged pivot pin, a nose guard mounted to swing on said pivot pin, and a spring separate from the nose bearing portion of the guard secured to the bracket and to the guard.

4. The combination with a vertically extending attaching bracket having an eye carrying a vertically arranged pivot, of a nose guard mounted on the pivot, and having a forwardly extending operating arm, and a spring surrounding the pivot and having one of its ends secured to the bracket and the other of its ends secured to the nose guard.

5. The combination with a nose guard having an operating arm, of an attaching bracket on which the arm is mounted to turn about a vertical axis, extending upwardly from the latter, and a separate spring for moving the guard toward the nose.

6. In an eyeglass mounting, the combination with a pair of lens mounts, and a bridge connecting them, of a pair of brackets, nose guards mounted thereon to swing about vertical axes, a spring for moving each guard toward the nose and a fastener for securing each end of the bridge and a bracket to a lens mount.

7. In an eyeglass mounting, the combination with a pair of lens mounts having seats, and a bridge having portions secured in the seats, of brackets also secured in the seats, nose guards mounted to swing about vertical axes on the brackets, and springs separate from the nose bearing portions of the guards, positioning the latter.

8. The combination with an attaching bracket, of a nose guard swingingly mounted on the same and having a forward operating arm bent vertically and extended outwardly.

9. The combination with a vertical extending attaching bracket, of a nose guard pivoted to the lower end of the same and having a forward operating arm bent upwardly and extended outwardly.

10. In an eyeglass mounting, the combination with a support having lens mounts, of nose guards pivoted on one side of the support and having operating arms bent at right angles to the horizontal plane of the lens mounts and extended outwardly.

11. In an eyeglass mounting, the combination with a support, of nose guards pivoted on the under side of the support and having operating arms bent upwardly and extended outwardly.

LEO F. ADT.

Witnesses:
EDWARD MURPHY, 2d.,
CHARLES S. ALDRICH.